United States Patent
Dalton

(10) Patent No.: US 6,612,536 B2
(45) Date of Patent: Sep. 2, 2003

(54) REMOTE SHUT-OFF VALVE

(76) Inventor: Martin Walter Dalton, Gleneagles, 52 Dovehouse Lane, Solihull, B91 2EE (GB)

( * ) Notice: Subject to any disclaimer, the term of this patent is extended or adjusted under 35 U.S.C. 154(b) by 0 days.

(21) Appl. No.: 10/047,788

(22) Filed: Jan. 14, 2002

(65) Prior Publication Data

US 2003/0132408 A1 Jul. 17, 2003

(51) Int. Cl.$^7$ ............................................. F16K 31/12
(52) U.S. Cl. ........................ 251/25; 251/45; 251/30.05; 251/41
(58) Field of Search .................... 251/41, 45, 46, 251/44, 43, 30.01, 30.02, 25, 335.2, 30.04, 30.05; 285/319, 320

(56) References Cited

U.S. PATENT DOCUMENTS

| 2,235,304 A | | 3/1941 | Toussaint | |
|---|---|---|---|---|
| 2,417,994 A | * | 3/1947 | Sheets | 251/45 |
| 2,991,796 A | * | 7/1961 | Griswold | 251/50 |
| 3,379,406 A | | 4/1968 | Greer | |
| 3,536,294 A | | 10/1970 | Rodriguez | |
| 3,568,706 A | * | 3/1971 | Weise | 137/492 |
| 3,669,143 A | * | 6/1972 | Reese | 137/512.3 |
| 4,058,286 A | * | 11/1977 | Berger | 251/45 |
| 4,063,708 A | * | 12/1977 | Smith | 251/149.6 |
| 4,214,779 A | * | 7/1980 | Losell | 285/319 |
| 4,913,401 A | * | 4/1990 | Handke | 251/900 |
| 5,060,694 A | * | 10/1991 | Florida et al. | 251/25 |
| 5,816,286 A | * | 10/1998 | Scott et al. | 137/489 |

FOREIGN PATENT DOCUMENTS

| EP | 0 654 628 | 5/1995 | |
|---|---|---|---|
| FR | 2343181 A | 3/1977 | |
| GB | 2279393 | 1/1995 | E03B/7/07 |
| JP | 60151483 | 8/1985 | |
| WO | WO 97/05416 | 2/1997 | 31/12 |

* cited by examiner

*Primary Examiner*—Ehud Gartenberg
*Assistant Examiner*—John Bastianelli
(74) *Attorney, Agent, or Firm*—Steven J. Hultquist; Marianne Fuierer; Yongzhi Yang

(57) ABSTRACT

This invention relates to a remote shut-off valve, and in particular to a valve for the remote shutting-off of a fluid such as a main water supply. The remote shut-off valve comprises a diaphragm valve and a pilot valve which are connected together by way of flexible tubes so that that pilot valve can be located in a desired location remote from the diaphragm valve. Part of the flow channels between the diaphragm valve and the pilot valve, and also the flow channel to the control chamber of the diaphragm valve are located within the body of the diaphragm valve. Quick-release connectors can be provided to connect the flexible tubes to the pilot valve and to the diaphragm valve.

12 Claims, 3 Drawing Sheets

REMOTE SHUT-OFF VALVE

FIELD OF THE INVENTION

This invention relates to a remote shut-off valve, and in particular to a valve for the remote shutting-off of a fluid such as a main water supply.

The invention is expected to find its greatest utility as a shut-off valve for the water supply to a domestic dwelling, and the following description will therefore relate primarily to such application. However, use of the invention for other liquid flows such as liquid petrochemicals, and in other applications such as the water supply to commercial and recreational premises, are not thereby excluded. Also, the invention is applicable to gas flows, i.e. it can be used to shut off the flow of, a gas along a pipeline.

BACKGROUND TO THE INVENTION

The mains water supply usually enters a domestic dwelling through a single pipeline, and close to the point of entry a tap (known as a "stop-cock") is typically provided so that the water supply to the dwelling can be shut-off if required, for example if there is a water leak within the dwelling. The stop-lock is usually located out of sight, and is not always easily accessible, particularly for the elderly or infirm. In addition, the stop-lock may not need to be operated for many years, and might have become seized during that time, so that it is not possible for the dwelling occupier to operate it when it is ultimately required.

DISCLOSURE OF THE PRIOR ART

It is known to provide a shut-off valve which can be fitted into the mains supply adjacent or instead of the stop-cock, which shut-off valve can be more easily operated, particularly by the elderly or infirm. In addition, certain designs are remotely operated so that the valve can be actuated from a convenient location.

One prior art device is disclosed in GB patent application 2,279,393. That document discloses an electrically-operated stop-cock which can be fitted to the mains supply pipe in addition to or instead of the manually-operated stop-cock. The electically-operated stop-cock can be actuated by the dwelling occupier from a remote location.

The device of GB 2,279,393 has the major disadvantages of being expensive and complex, due to the requirement for electrical actuation. Also, it is indicated that in the event of an electrical failure the valve will close, shutting off the water supply, but that a magnet can be used to-reopen the valve manually if desired. Clearly, it might not be desired that the water be shut off if there is a failure in the electricity supply, and the requirement to locate a suitable magnet, and then be able to open the valve manually, is likely to be extremely difficult.

Another prior device is disclosed in WO 97/05416. In that document there is provided a shut-off valve which can be actuated remotely, and which operates by water pressure alone, i.e. it requires no complex mechanical or electrical components. That document discloses a diaphragm valve located in a water supply pipeline, and which valve is normally biassed closed. When it is desired for water to flow along the pipeline (which may be connected to a tap over a domestic sink for example), the user can depress an actuator which mechanically opens a pilot valve, which in turn opens the diaphragm valve and allows water to flow along the pipeline. When the user stops depressing the actuator the pilot valve closes and the diaphragm valve subsequently closes. The device is intended to save water use by cutting off the water supply to the tap when the actuator is not being depressed, in the event that the tap is left turned on, for example.

The device of WO97/05416 also has a number of disadvantages for use as a shut-off valve, however. Thus, it is designed to fit into a pipeline adjacent an individual water outlet or tap, and is therefore normally biassed closed. The present invention, however, is directed to a stop-cock which controls the flow of all water into the building, and so is normally open. It is not practical for an shut-off valve such as that of WO97/05416 to be used for the mains supply pipeline into a building or dwelling.

Also, the device of WO97/05416 is directional, in that both the diaphragm valve and the pilot, valve must be fitted correctly into the water supply line; incorrect fitment of either component will result in the device not operating correctly, e.g. the diaphragm valve could remain closed even if the pilot valve is opened.

In addition, the water pressure within the pilot valve seeks to open the pilot valve, but this water pressure is resisted by the mechanical linkage of the actuator. If the mechanical linkage should fail, the pilot valve and hence the diaphragm valve would be biassed towards its open condition, avoiding the intended purpose of the device.

Furthermore, the inlet to the diaphragm valve communicates with the control chamber above the diaphragm by way of a number of small holes in the diaphragm. The size of those holes is critical to operation of the device. It is a recognised disadvantage of such diaphragm valves that if the holes are too large then the diaphragm valve will not open even if the pilot valve is opened, so that fluid flows from the inlet to the outlet by way of the holes in the diaphragm and the pilot valve. The holes in the flexible diaphragm may become enlarged through successive opening and closing movements of the diaphragm, leading to premature failure of the device.

In the disclosed embodiments of the device of WO97/05416, there is a threaded connection between the valve body and the valve top; securement of the valve top is likely to distort the diaphragm which might also act to increase the size of the holes, increasing the likelihood of premature failure of the device.

The connections between the flexible fluid conduits and the rigid components of the device of WO97/05416 are by way of push-on fish-tail connectors, which are not suitable for mains water pressure supply, i.e such connectors are likely to leak at mains water pressures.

Alternative quick-release connections are known for use in mains water supply applications. Ones such connection is known as a "John Guest" connection in which the flexible fluid conduit is fitted into an opening in a rigid body and engages an O-ring seal. A resilient collet surrounds the end of the flexible conduit and is located within the recess. The formation of the collet and recess is such that attempts to pull the flexible conduit out of the recess act to increase the friction between the collet and the conduit so that the conduit is effectively retained within the collet, in sealing engagement with the O-ring. Quick-release of the connection is possible, however, in that when it is desired to remove the conduit from the recess it is necessary to press the collet into the recess as the conduit is being removed.

SUMMARY OF THE INVENTION

It is an object of the present invention to reduce or avoid the disadvantages of the devices mentioned above. It is a further object to provide a remote shut-off valve which can be quickly and easily installed into a mains water supply pipeline.

According to the present invention there is provided a remote shut-off valve comprising a diaphragm valve and a pilot valve, the diaphragm valve having an inlet, an outlet, a valve member and a valve seat, the valve member having a closed position in which it engages the seat and blocks the flow of fluid from the inlet to the outlet and an open position in which the valve member does not engage the valve seat and fluid can flow from the inlet to the outlet, a first fluid conduit connecting the inlet of the diaphragm valve to the inlet of the pilot valve and a second fluid conduit connecting the outlet of the pilot valve to the outlet of the diaphragm valve, the diaphragm valve having a control chamber, and a flow channel connecting the control chamber to the diaphragm valve inlet, characterised in that the flow channel is located within the body of the diaphragm valve.

By virtue of the flow channel being located within the body of the diaphragm valve, it is not necessary to have holes in the diaphragm itself, so that the above-mentioned disadvantages of such an arrangement are reduced or avoided.

Connecting the control chamber to the diaphragm valve inlet ensures that the diaphragm valve will be biassed closed when the pilot valve is closed, and the diaphragm valve will be open when the pilot valve is open. Since it is intended that the diaphragm valve will normally be open (and will only be shut when it is desired to close off the mains water supply pipeline to the dwelling or the like) the pilot valve normally remains open. It is an advantage of such an arrangement that whilst the pilot valve is open, fluid will flow along the fluid conduits (in addition to the flow through the diaphragm valve) and so reduce the likelihood that scale or other deposits will build up in the fluid conduits or the pilot valve.

Preferably, the diaphragm valve includes a removable cap member which provides the control chamber; preferably also a part of the fluid conduits are formed through the cap member. Desirably, the flow channel comprises a branch in the first fluid conduit within the cap member. Desirably also the periphery of the diaphragm can be clamped between the cap member and the diaphragm valve body. Such an arrangement reduces the complexity of the diaphragm valve, and in particular makes assembly easier, and also replacement of the diaphragm easier, should this become necessary. In addition, the diaphragm periphery can act as a seal between the cap member and the diaphragm valve body.

Desirably, the diaphragm valve body, cap member, pilot valve body and valve member are manufactured from plastics materials. Such materials are known to be less liable to scale formation (as might occur with some mains water supplies) than metallic components.

Preferably, part of the first and second fluid conduits are provided by respective flexible tubes secured to the diaphragm valve (and preferably to the cap member thereof) by way of "quick-release" connectors. Ideally, the quick-release connectors include respective O-ring seals which can engage a part of the flexible tube and provide a seal therearound. Preferably, releasable securing means are provided to secure the flexible tubes within the respective O-ring seal. In a preferred embodiment, the releasable securing means for securing the flexible tubes to the diaphragm valve comprises a securing housing within which both of the tubes are securely retained, the housing carrying locking means to lock the housing, and therefore the flexible tubes, to the diaphragm valve.

The provision of flexible tubes providing a part of the respective fluid conduits is advantageous for remote applications, since the diapgragm valve and the pilot valve can be secured in their required or desired positions, and the flexible tubes can be manipulated as required to provide the fluid communication therebetween.

Desirably, the flexible tubes are at least partially resilient, and each is retained within the securing housing at least in part by a curved channel within which the tube is located. It will be understood that a flexible resilient tube will seek to straighten itself out into a substantially a linear configuration; forcing the tube into a curve can result in a frictional engagement retaining the tube within the channel.

Preferably, the securing housing includes a collar for each of the respective flexible tubes; preferably also, a part of the channel wall is removed at a position substantially aligned with the collar. The removed wall allows the tube to be maintained substantially linear whilst it is inserted into the required position relative to the collar; only when the tube has been correctly positioned within the collar is it necessary to curve the tube to locate this within the channel.

Preferably, the pilot valve is located within a valve housing. Preferably also, the valve housing includes a curved channel for each of the flexible tubes. Desirably, the pilot valve is removable from the housing. This arrangement permits the flexible tubes to be fitted to the pilot valve in a substantially linear configuration, or at least a configuration with shallow curvature. Only when the conduits are secured to the pilot valve is it necessary to curve each tube into its respective channel, the tendency of the tube to straighten itself out acting to retain it within the channel.

BRIEF DESCRIPTION OF THE DRAWINGS

The invention will now be described, by way of example, with reference to the accompanying drawings, in which.

DESCRIPTION OF THE EXEMPLARY EMBODIMENTS

Figure 1:
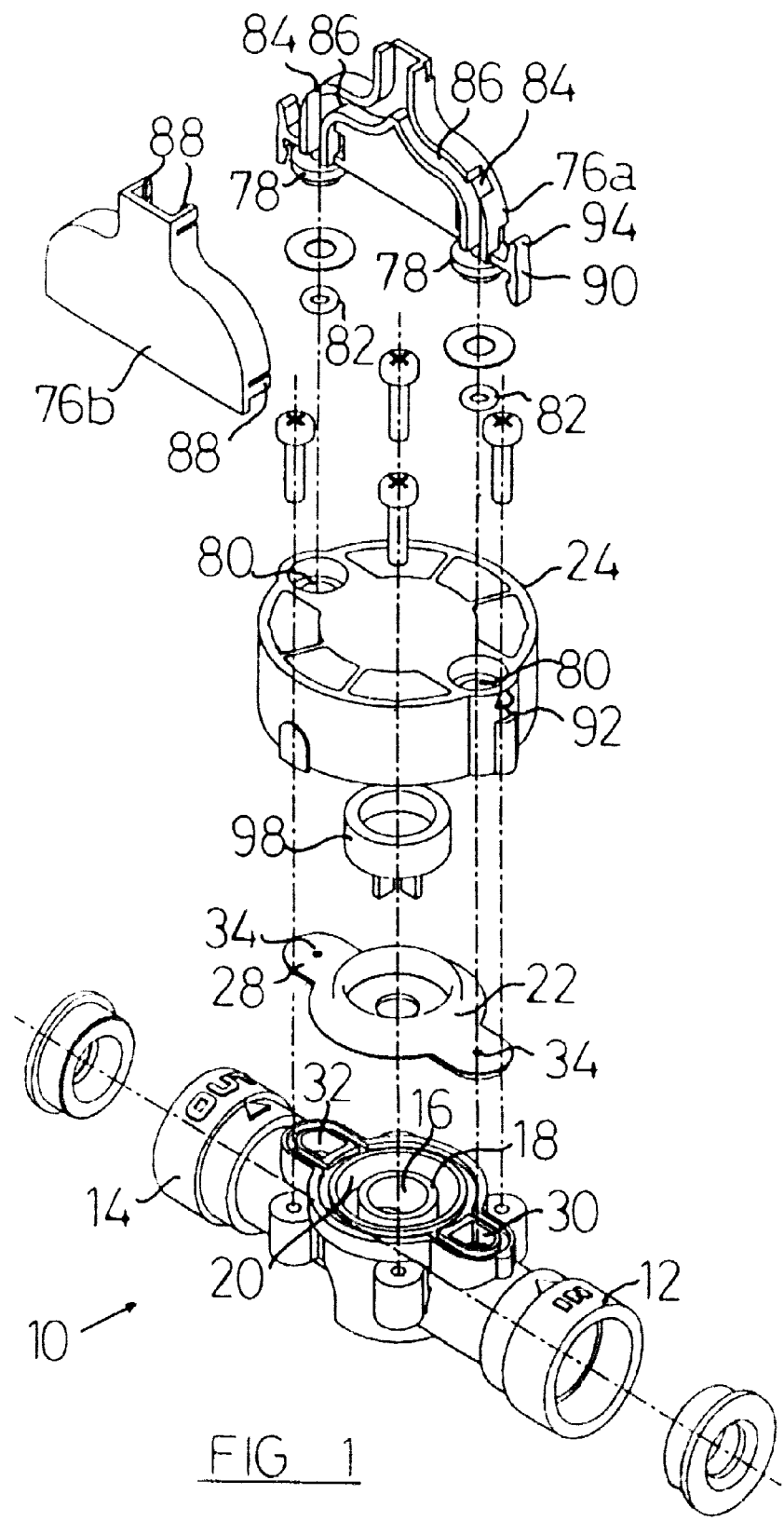
FIG. 1 is a perspective, exploded, view of a diaphragm valve for use in the shut-off valve according to the invention.

FIG. 1 shows the diaphragm valve having a body 10, which in commom with prior art diaphragm valves has an inlet 12 and an outlet 14. The outlet 14 is in fluid communication with the hollow interior 16 of the valve seat 18, and the inlet 12 is in fluid communication with the chamber 20 surrounding the valve seat 18.

The flexible diaphragm 22 can be clamped to the body 10, and is flexible so that it can alternately seal against the valve seat 18, in which case it closes off the flow of fluid from the chamber 20 to the hollow interior 16 (and so from the inlet 12 to the outlet 14), and be free of the valve seat, in which case fluid can flow from the chamber 20 to the hollow interior 16 (and so from the inlet 12 to the outlet 14).

In the embodiment shown the inlet and outlet are marked accordingly, and it is necessary to fit the diaphragm valve correctly into the pipeline, for the reason explained below.

Figure 3:
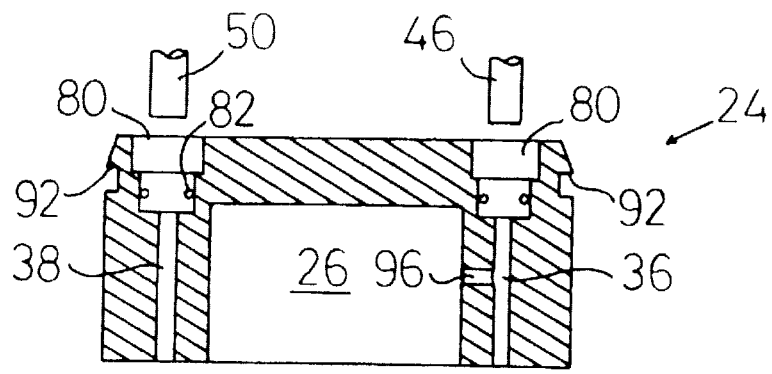
FIG. 3 is a sectional view through the cap member of the diaphragm valve of FIG. 1.

The diaphragm valve also includes a cap member 24, as also shown in FIG. 3 The cap member 24 provides therein the control chamber 26, which in the assembled condition of the diaphragm valve is located above the diaphragm 22. In known fashion, the pressure within the control chamber 26 determines whether or not the diaphragm valve is closed or open, i.e. whether or not the diaphragm 22 engages the valve seat 18.

Formed in the body 10 are two openings 30,32 which are connected by way of narrow channels (not seen) to the inlet and outlet respectively; the openings 30,32 therefore comprise part of the respective flow channels. The diaphragm 22 has two holes 34 therethrough which in the assembled condition are aligned with the flow channels 30,32. The holes 34 lie outside the area of the control chamber 26 in the assembled condition, so that fluid does not flow into and out of the control chamber through the holes 34.

Figure 2:
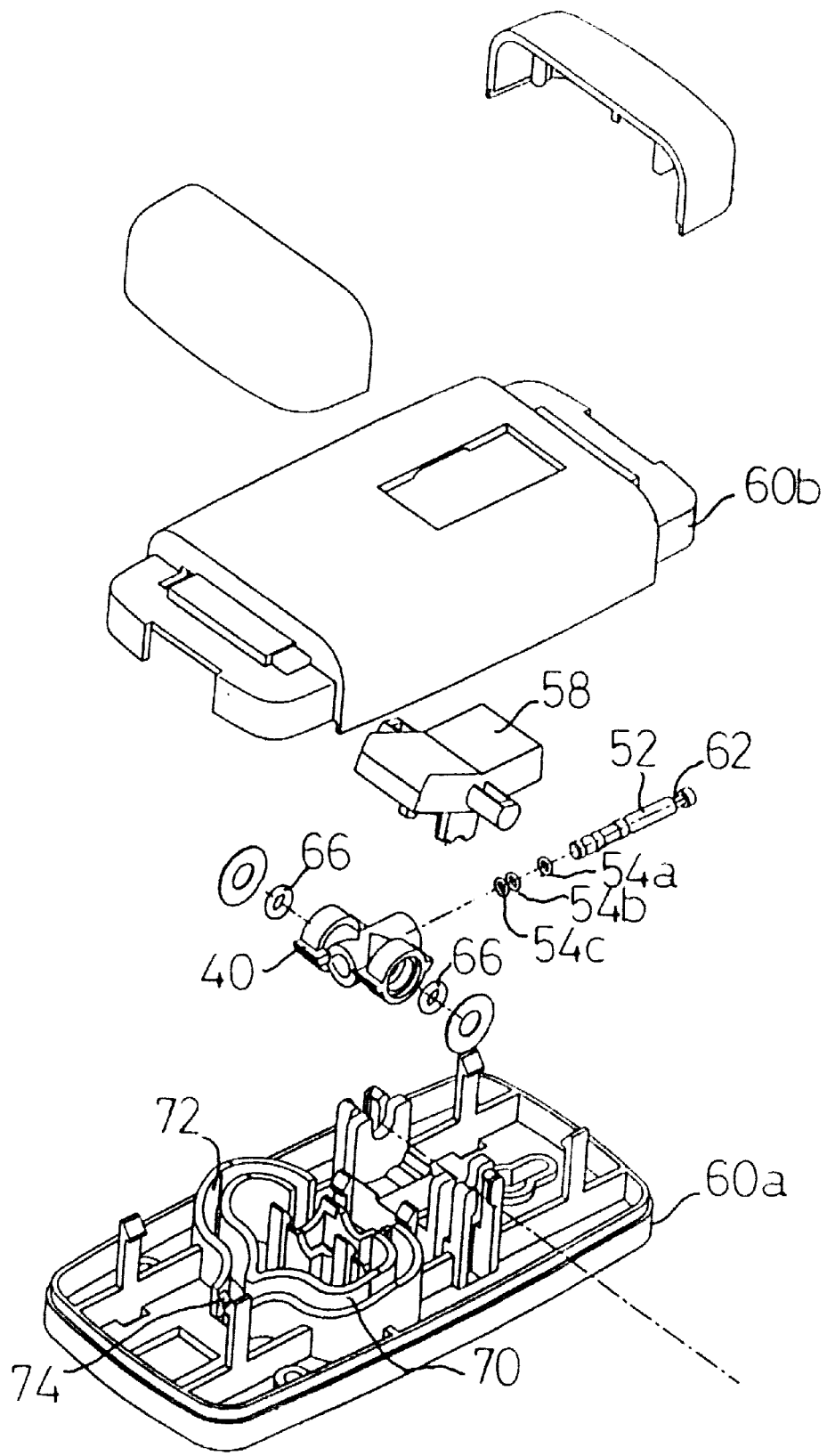
FIG. 2 is a perspective, exploded, view of a pilot valve for use in the shut-off valve according to the invention.

As shown in FIG. 3, the cap member 24 has two flow channels 36,38, which in the assembled condition are aligned with the holes 34, and so with the respective flow channels 30,32. The flow channels 30 and 36 provide parts of the first fluid conduit by which fluid can flow from the inlet 12 to the pilot valve 40 (FIG. 2); the flow channels 32,38 provide parts of the second fluid conduit by which fluid can flow from the pilot valve 40 to the outlet 14.

The holes 34 are formed in elongations 28 of the diaphragm 22. It will be understood that when the cap member 24 is secured to the valve body 10, the periphery of the diaphragm 22 is sealingly clamped therebetween. In addition, the elongations 28 are clamped between the cap member 24 and the valve body 10 surrounding the respective openings 30,32, so providing a seal around those openings.

Figure 4:
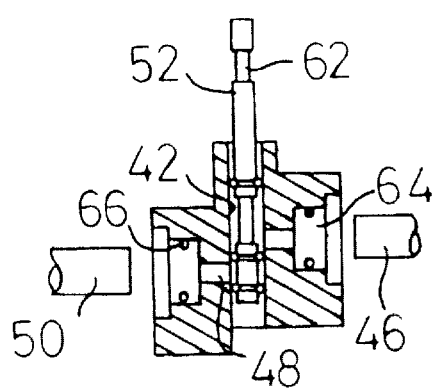
FIG. 4 if is a sectional view through the pilot valve in the valve closed condition.
Figure 5:
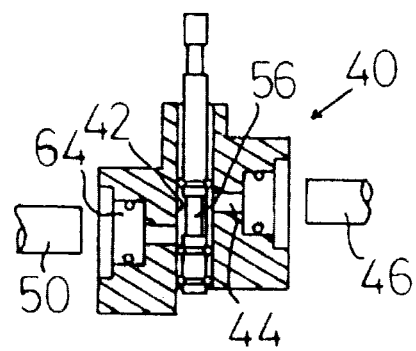
FIG. 5 is a view as FIG. 4 in the valve open condition.

As better seen in FIGS. 4 and 5, the pilot valve comprises a valve chamber 42 to which is connected the inlet 44 (which is connected to the first fluid conduit 46, and an outlet 48 (which is connected the second fluid conduit 50). Within the valve chamber is located a valve member 52, which carries three sealing O-rings 54a, 54b and 54c (see also FIG. 2). The valve member 52 is slidably mounted within the valve chamber 42 and can move between a "valve closed" position shown in FIG. 4 and a "valve open" position shown in FIG. 5. It will be understood that in the open position of FIG. 5, fluid can flow from the inlet 44, around the central section 56 of the valve member 52, and out of the outlet 48. When the valve member 52 is in its closed position of FIG. 4, the O-ring 54b prevents fluid passing from the inlet 44 to the outlet 48.

A toggle switch 58 is provided (FIG. 2), which is pivotably mounted in the pilot valve housing 60a,b. The toggle switch engages the reduced-diameter section 62 of the valve member 52 and can drive the valve member 52 between its two positions. In this embodiment the toggle switch 58 can remain in one or other of its two positions so that the pilot valve is held open or closed, but in other less desirable embodiments the toggle switch can be biassed towards one of its two positions so that it will remain open or closed unless held in its other position by manual force.

The pilot valve 40 has a pair of recesses 64 within which are located respective O-ring seals 66. The O-ring seals 66 are sized to form a seal around the flexible resilient tubes 46 and 50 which comprise parts of the first and second fluid conduits respectively. The tube 46 connects the flow channel 36 of the cap member 24 to the inlet 44 of the pilot valve 40, and the tube 50 connects the outlet 48 of the pilot valve with the flow channel 38 of the cap member 24.

The pilot valve 40 is removable from the housing parts 60a,b so that the flexible tubes 46,50 can be sealingly inserted thereinto. Subsequently, the pilot valve 40 is placed into the housing part 60a, the flexible tube 46 is curved around the channel 70 and the flexible tube 50 is curved around the channel 72. The channels 70,72 terminate at a common opening, within which the tubes 46,50 are retained by clip members 74 (only one of which can be seen in FIG. 2).

When the tubes 46,50 have been correctly fitted within their respective channels 70,72, the housing part 60b is secured to the housing part 60a, so closing off the channels 70,72 and retaining the tubes 46,50 therein.

The other ends of the tubes 46,50 are connected to the securing housing 76a,b (FIG. 1). The securing housing part 76a carries two collars 78, each of which is adapted to receive and locate an end part of a flexible tube. When assembled, the collars 78 locate within the respective recesses 80 of the cap member, which recesses also locate an O-ring seal 82. When assembled, the tubes 46,50 project by several millimetres from the collars 78, and so project into the recesses 80, engaging the O-ring seals therein.

During fitment of the tubes 46,50 into the collars 78 of the securing housing part 76a, the tubes are substantially linear, by virtue of the openings 84 provided in the wall of the channels 86. When each of the tubes 46,50 has been correctly positioned within its respective collar, each tube is removed from its openings and curved around the respective channel 86. When each tube has been curved around its channel 86, the securing housing part 76b is fitted to the securing housing part 76a, closing off the channels and retaining the flexible tubes therein.

The housing part 76b has four resilient fingers 88 which can snap into position around respective portions of the housing part 76 to secure the two housing parts together.

Following fitment of the tubes 46,50 into the securing housing 76a,b, the securing housing 76a,b is assembled to the cap member 24. To do this, it is only necessary to move the securing housing 76a,b into engagement with the cap member 24, whereupon the projecting ends of the tubes 46,50 will enter into the respective recess 80 and sealing O-ring 82.

The securing housing part 76a carries a pair of resilient locking tabs 90 which can locate behind ledges 92 of the cap member 24, to secure the housing 76a,b to the cap member 24.

Release of the securing housing 76a,b from the cap member 24 is readily accomplished by pressure upon the ends 94 of the locking tabs 90, which releases the locking tabs 90 from the ledges 92.

It will be seen from FIG. 3 that the flow channel 36 within the cap member 24 has a branch 96, which communicates fluid from the first fluid conduit to the control chamber 26.

Shown in FIG. 1 is a control member 98 which in the assembled condition lies within the control chamber 26 and limits the opening movement of the diaphragm 22.

It will therefore be understood that the connections between the pilot valve 40 and cap member 24 and each of the tubes 46,50 are by way of quick-release connectors which require a tube to be pressed into a sealing O-ring. Despite the simplicity of the connection (and disconnection) such seals are known to be suitable for mains water pressures. Similar connectors could be used to connect the inlet and outlet pipelines (not shown) to the inlet 12 and outlet 14 respectively, though alternatively a threaded connection could be used at those junctions, as desired.

It will also be understood that the pilot valve 40 and the tubes 46,50 are non-directional, and can be fitted either way around without affecting the operation of the device. The non-directional nature of the pilot valve in particular reduces the difficulty of on-site assembly, and ensures that the fitter does not need to trace the path of tubes 46,50 from the diaphragm valve to the pilot valve, which path might in practice cover a distance of several metres, part of which might be obscured from view.

As above indicated, when in use the device is designed normally to be open (corresponding to the conventional stop-cock which is also normally open). In such circumstances the pilot valve will be open, and fluid (water) will flow through the inlet flow channels 30,36, along the tube 46, past the valve member 52, along the tube 50, and through the flow channels 38,32 to the outlet 14. Because the inlet flow channel 36 is at a pressure close to that of the outlet 14, the control chamber 26 will also be at a pressure close to that of the outlet, in which case the diaphragm 22 will be away from its seat allowing flow from the inlet 12 to the outlet 14 past the diaphragm 22.

When it is desired to stop the flow of water, the pilot valve can be closed by way of movement of the toggle switch 58. Closure of this switch cuts off the inlet 44 of the pilot valve 40 from the outlet 48, so that the pressure in the inlet fluid conduit (comprising the flow channels 30 and 36 and the tube 46), and hence also in the control chamber 26, rises substantially to that of the inlet 12. This causes the diaphragm 22 to close against the seat 18, shutting off flow from the inlet 12 to the outlet 14.

It will be understood that it is an important part of the present invention that the pilot valve and the diaphragm valve be readily separable so that the pilot valve can be remote from the diaphragm valve, and in practice these components will be supplied separately. This is because the diaphragm valve will typically be fitted to the mains supply pipeline close to where that pipeline enters the building, and usefully close to the existing stop-cock. The pilot valve, on the other hand, should be fitted in a location which is easy to reach when required, perhaps adjacent the kitchen sink top for example. It will often be necessary to feed the tubes 46,50 through a work surface or other partition, and it is desirable that only a small hole need be drilled into such work surface or partition to allow passage of the tubes 46,50. The ability to fit the tubes 46,50 to the pilot valve and to the diaphragm valve on-site, with a minimum of effort and without specialist (or perhaps any) tools, is a significant advantage when installing the device. Often, the tubes 46,50 would be supplied in long lengths, and designed to be cut to length on site by the installer.

The tubes 46,50 could suitably be of low density polythene tubing having an outside diameter of approximately 4 mm. Alternatively, nylon tubing having an outside diameter of approximately 4 mm would be suitable. With such tubing, the minimum radius of curvature is approximately 8 mm, i.e. the curvature of the channels 70,72,86 should be shallower than approximately 8 mm, so that the tubes do not kink or bend abruptly when being curved thereaound. In addition, it will be understood that the tubes 46,50 will tend to straighten out when under pressure, so that the frictional retention within the channels increases when the tubes are filled with water at around mains water pressure.

As indicated above, the diaphragm valve is directional, in commom with most other diaphragm valves. The major factor in determining the directionality is that the channel between the inlet 12 and the opening 30 is of smaller cross-section than the channel between the outlet 14 and the opening 32, and this is necessary so that the greatest restriction to flow through the pilot valve occurs upstream of the control chamber (so that when the pilot valve is opened fluid can flow out of the control chamber). Fitting the diaphragm valve body 10 into the pipeline the wrong way around would mean that the control chamber would remain at or close to the inlet pressure regardless of the position of the pilot valve.

What is claimed is:

1. A remote shut-off valve comprising a diaphragm valve and a pilot valve, the diaphragm valve having an inlet, an outlet, a valve member and a valve seat, the valve member having a closed position in which it engages the seat and blocks fluid flow from the inlet to the outlet and an open position in which the valve member does not engage the valve seat and fluid can flow from the inlet to the outlet, a first fluid conduit connecting the inlet of the diaphragm valve to the inlet of the pilot valve and a second fluid conduit connecting the outlet of the pilot valve to the outlet of the diaphragm valve, the first fluid conduit having a first part and a second part, the second fluid conduit having a first part and a second part, the first part of the first fluid conduit and the first part of the second fluid conduit being provided by respective flow channels in the body of the diaphragm valve, the second part of the first fluid conduit and the second part of the second fluid conduit being provided by respective flexible tubes, the diaphragm valve having a control chamber, and a flow channel connecting the control chamber to the diaphragm valve inlet, wherein the flow channel connecting the control chamber to the diaphragm valve inlet is a branch off the first part of the first fluid conduit within the body of the diaphragm valve.

2. A remote shut-off valve according to claim 1 wherein the body of the diaphragm valve includes a removable cap member which provides the control chamber, the flow channel being located within the cap member.

3. A remote shut-off valve according to claim 2 wherein a part of the fluid conduits are formed within the cap member, and in which the flow channel comprises a branch in the first fluid conduit within the cap member.

4. A remote shut-off valve according to claim 2 wherein the diaphragm valve includes a housing, and wherein the periphery of the valve member is clamped between the cap member and the housing.

5. A remote shut-off valve according to claim 1 wherein the flexible tubes are secured to the body of the diaphragm valve by way of quick-release connectors.

6. A remote shut-off valve according to claim 5 wherein the quick-release connectors include respective O-ring seals which can engage a part of a flexible tube and provide a seal therearound.

7. A remote shut-off valve according to claim 6 wherein releasable securing means are provided to secure the flexible tubes within the respective O-ring seal.

8. A remote shut-off valve comprising a diaphragm valve and a pilot valve, the diaphragm valve having an inlet, an outlet, a valve member and a valve seat, the valve member having a closed position in which it engages the seat and blocks fluid flow from the inlet to the outlet and an open position in which the valve member does not engage the valve seat and fluid can flow from the inlet to the outlet, a first fluid conduit connecting the inlet of the diaphragm valve to the inlet of the pilot valve and a second fluid conduit connecting the outlet of the pilot valve to the outlet of the diaphragm valve, the diaphragm valve having a control chamber, and a flow channel connecting the control chamber to the diaphragm valve inlet, wherein the flow channel is located within the body of the diaphragm valve, wherein part of the first and second fluid conduits are provided by respective flexible tubes, and wherein releasable securing means is provided for securing the flexible tubes to the body of the diaphragm valve, the releasable securing means comprising a securing housing within which both of the flexible tubes are retained, the securing housing carrying locking means to lock the securing housing to the body of the diaphragm valve.

9. A remote shut-off valve according to claim 8 wherein the flexible tubes are at least partially resilient, and wherein part of each tube is retained in the securing housing within a respective curved channel.

10. A remote shut-off valve according to claim 9 wherein each curved channel is bordered by a wall, and a part of the wall has an opening through which the flexible tube may be passed.

11. A remote shut-off valve comprising a diaphragm valve and a pilot valve, the diaphragm valve having an inlet, an outlet, a valve member and a valve seat, the valve member having a closed position in which it engages the seat and blocks fluid flow from the inlet to the outlet and an open position in which the valve member does not engage the valve seat and fluid can flow from the inlet to the outlet, a first fluid conduit connecting the inlet of the diaphragm valve to the inlet of the pilot valve and a second fluid conduit connecting the outlet of the pilot valve to the outlet of the diaphragm valve, the diaphragm valve having a control chamber, and a flow channel connecting the control chamber to the diaphragm valve inlet, wherein the flow channel is located within the body of the diaphragm valve, wherein part of the first and second fluid conduits are provided by respective flexible tubes, wherein the pilot valve is located within a valve housing, and wherein the valve housing includes a respective curved channel for each of the flexible tubes.

12. A remote shut-off valve according to claim 1 in which the pilot valve is non-directional.

* * * * *

UNITED STATES PATENT AND TRADEMARK OFFICE
CERTIFICATE OF CORRECTION

PATENT NO.     : 6,612,536 B2                                                    Page 1 of 1
DATED          : September 2, 2003
INVENTOR(S)    : Dalton It is certified that error appears in the above-identified patent and that said Letters Patent is hereby corrected as shown below:

Column 1,
Line 17, "of, a" should be -- of a --
Lines 25 and 27, "stop-lock" should be -- stop-cock --

Signed and Sealed this

Eleventh Day of November, 2003

JAMES E. ROGAN
*Director of the United States Patent and Trademark Office*